June 29, 1971 S. J. REED 3,589,971
INSULATING JACKETS FOR INSTRUMENTS COMPRISING A LAYER
OF ASBESTOS CLOTH, A LAYER OF COTTON DRILL FABRIC, A
LAYER OF GLASS FIBER INSULATION AND
A LAYER OF NEOPRENE COATED
ALUMINIZED NYLON
Filed Aug. 4, 1967
3 Sheets-Sheet 1
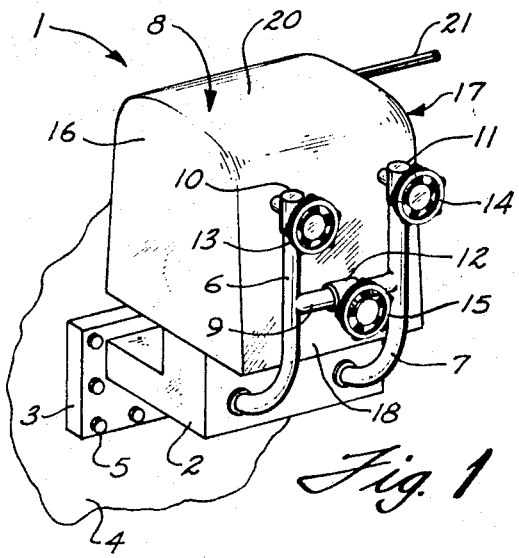
Fig. 1
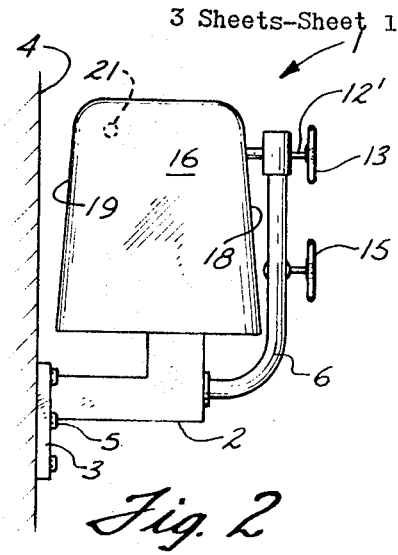
Fig. 2
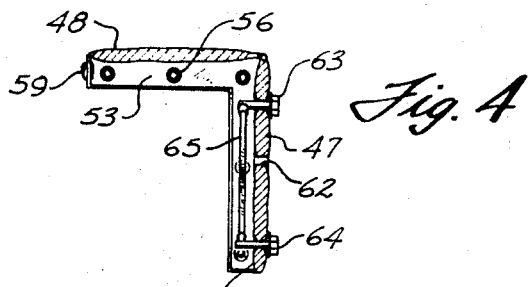
Fig. 4
Fig. 3
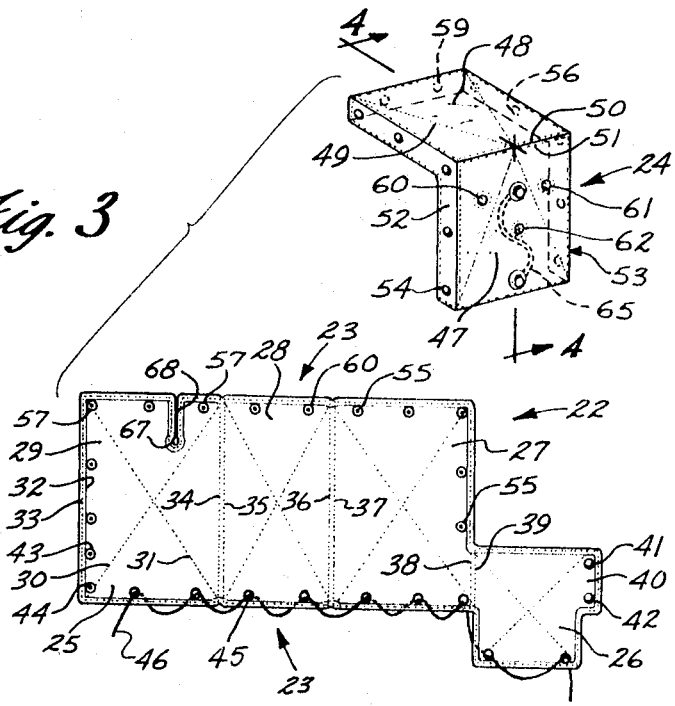
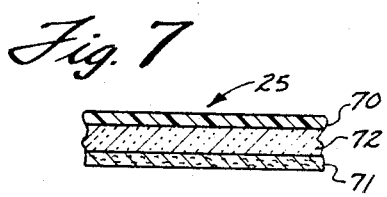
Fig. 7
Fig. 8
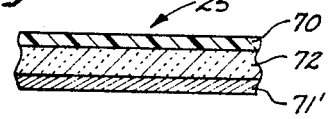
Fig. 9
INVENTOR
SHERIDAN J. REED
BY Arnold, Roylance,
Kruger & Durkee
ATTORNEYS June 29, 1971

S. J. REED 3,589,971

INSULATING JACKETS FOR INSTRUMENTS COMPRISING A LAYER
OF ASBESTOS CLOTH, A LAYER OF COTTON DRILL FABRIC, A
LAYER OF GLASS FIBER INSULATION AND
A LAYER OF NEOPRENE COATED
ALUMINIZED NYLON

Filed Aug. 4, 1967

INVENTOR

SHERIDAN J. REED

BY Arnold, Roylance
Kruger & Durkee

ATTORNEYS

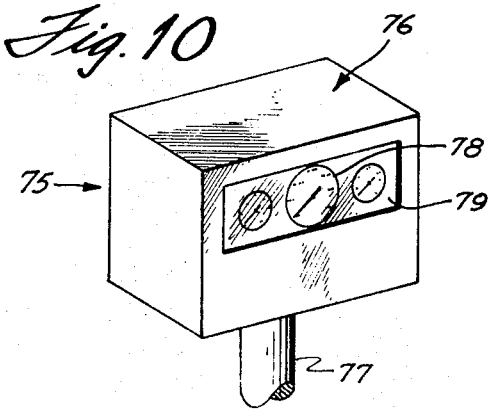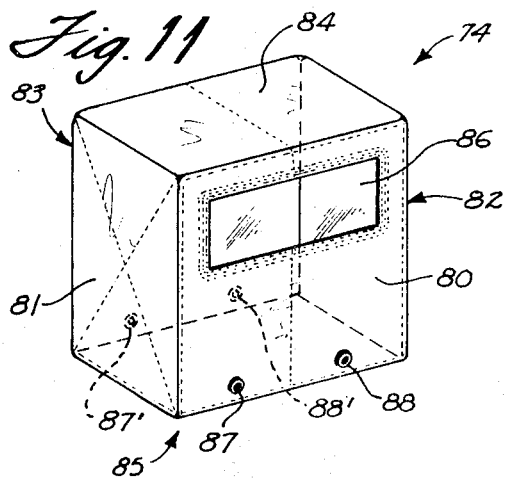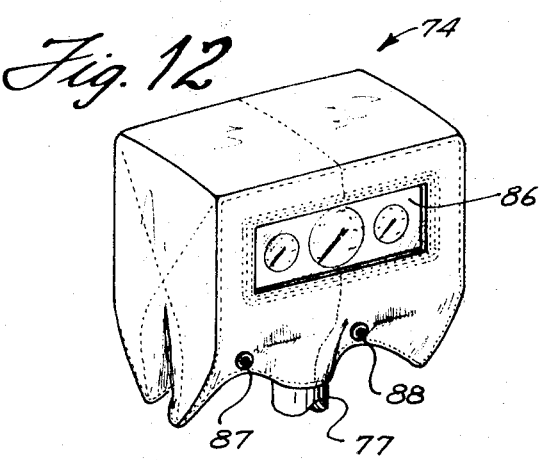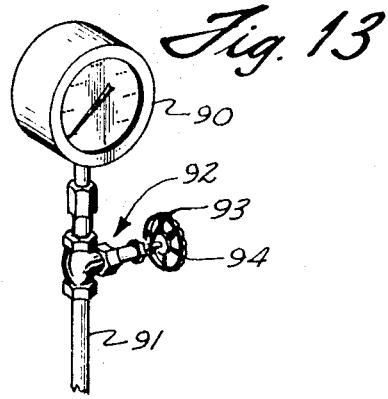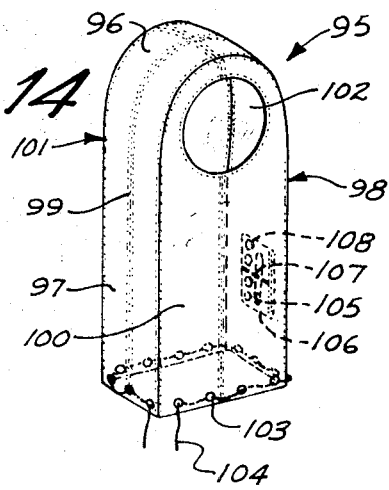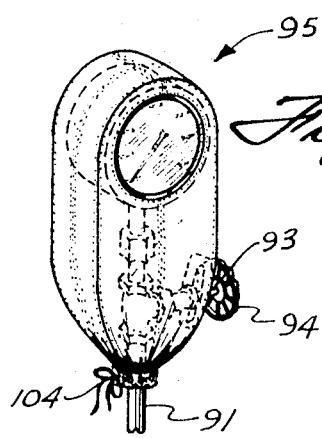

United States Patent Office 3,589,971
Patented June 29, 1971

3,589,971
INSULATING JACKETS FOR INSTRUMENTS COMPRISING A LAYER OF ASBESTOS CLOTH, A LAYER OF COTTON DRILL FABRIC, A LAYER OF GLASS FIBER INSULATION AND A LAYER OF NEOPRENE COATED ALUMINIZED NYLON
Sheridan J. Reed, 305 Cool Spring Drive, Rte. 3, Camden, S.C. 29020
Filed Aug. 4, 1967, Ser. No. 658,498
Int. Cl. B32b 3/06
U.S. Cl. 161—48                    1 Claim

ABSTRACT OF THE DISCLOSURE

The insulating jackets prevent freezing and rapid temperature fluctuations of instruments and control equipment, and are particularly useful to insulate such devices in chemical process equipment. The jackets are formed from a multilayer material which is weatherproof, is resistant to heat damage, and has excellent thermal insulating properties. Releasable fasteners facilitate rapid installation of the jackets, and allow removal of the jackets when the instruments require servicing.

---

This invention relates to the thermal insulation of instruments to protect the instruments against freezing in cold weather and to prevent rapid heating and cooling of instruments intermittently subjected to hot fluid by retaining heat from the fluids within the instrument.

More particularly, the invention relates to insulating jackets for instruments, which can be easily applied and removed so labor costs are minimized, and which are quite inexpensive, yet durable. While the insulating jackets of this invention have numerous uses, they find particular utility in the protection of instruments commonly used in chemical process equipment, and the preferred embodiments disclosed herein are for use to insulate such instruments.

In chemical process plants, various instruments, such as pressure gauges, valves, and control equipment of various types are located out-of-doors and are exposed. Hence, the instruments are frequently subjected to sub-freezing ambient temperatures. Where the instruments measure or control water or other liquid that may freeze, there is a severe danger of damage to the instrument if the liquid freezes.

In addition, instruments and control equipment are frequently intermittently subjected to hot fluids. Where the instruments are exposed, they quickly cool to the ambient temperature and thus, rapid heating and then rapid cooling occurs in cold weather. As is well known, rapid heating and cooling is detrimental to both instruments and control equipment and it is highly desirable to minimize the rate of change of the temperature of the instrument as much as possible.

In the past, instruments and control equipment have been insulated to prevent freezing and to provide for heat retainment. However, the insulation was permanently attached to the instruments and control equipment and was usually in the form of rigid blocks of insulating material which were cut to conform to the configuration of the instrument and the support on which the instrument was mounted, were held in place with metal bands, and required application of a sealant to the exposed surfaces of the insulation. Some other known prior art techniques included wrapping the instrument with asbestos cloth and then applying an appropriate sealer. Urethane foam has also been sprayed onto and thus bonded to various instruments and control equipment to provide the necessary thermal insulation.

These prior art methods of insulating instruments are quite expensive because skilled workmen are required to apply the "field insulation" discussed above. In addition, such permanently installed insulation must be removed when the instrument is serviced or requires adjustment, and it is necessary to destroy the insulation and then replace it each time the instrument is serviced.

One somewhat more successful prior art arrangement to thermally insulate instruments includes a permanent metal housing which surrounds the instrument and a particulate insulating material in the space between the housing and the instrument. Such housings, however, are expensive and require considerable dismantling when servicing the instrument.

Applicant's insulating jacket arrangement for instruments overcomes the problems and expenses of the prior art modes of insulating instruments. With the protective thermal insulating jacket of this invention, various instruments and control equipment can be readily and quickly insulated at little expense. The jacket is easy to install, and thus the expense of skilled workmen to insulate the instruments is avoided. In addition, the jacket is easy to remove for servicing of the instrument, and is reusable.

Correspondingly, it is a general object of this invention to provide a protective thermal insulating jacket for instruments to provide protection against high and low temperatures and also to provide for heat retainment to avoid rapid temperature fluctuations of the instrument.

Another object is a protective jacket formed from a flexible insulating material which conforms generally to the contour of the instrument or other equipment which is protected, fits snugly around the pipe or support on which the instrument is mounted, and is provided with suitable separable fasteners to facilitate installation of and removal of the jacket.

Another object is a protective insulating jacket with a flexible multi-layer wall structure which is easy to cut and stitch to provide a jacket of the desired configuration, is extremely durable and weather resistant, and insulates the instruments and control equipment on which it is installed as effectively, if not better than, the cumbersome more expensive insulating arrangements of the prior art.

In order that the manner in which the foregoing and other objects attained in accordance with this invention can be understood in detail, particularly advantageous embodiments thereof will be described with reference to the accompanying drawings, which form a part of this specification, and wherein:

FIG. 1 is a pictorial view showing one form of control equipment on which a first embodiment of the insulating jacket of this invention can be used;

FIG. 2 is a left-hand side view of the control equipment of FIG. 1;

FIG. 3 is a pictorial view showing the body portion of the insulating jacket in flattened condition, and a cover portion of the insulating jacket;

FIG. 4 is a vertical sectional view of the cover taken on lines 4—4 of FIG. 3;

FIGS. 7–9 are views in section of several embodiments of the multilayer wall structure of the insulating jackets of this invention;

FIG. 10 shows another instrument protectable by another form of insulating jacket in accordance with this invention;

FIG. 11 shows a second embodiment of insulating jacket adapted to protect the instrument of FIG. 10;

FIG. 12 shows the insulating jacket of FIG. 11 on the instrument of FIG. 10;

FIG. 13 shows another instrument, in this instance a Bourdon-type pressure gauge which can be protected by yet another embodiment of this invention;

FIG. 14 shows an insulating bag or jacket to protect the pressure gauge of FIG. 13;

FIG. 15 shows the insulating jacket of FIG. 14 installed on the pressure gauge of FIG. 13;

Figure 5:
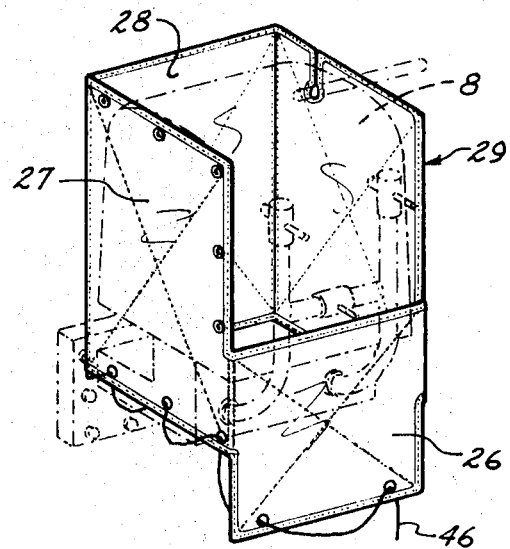
FIG. 5 is a pictorial view showing the insulating jacket of FIG. 3 partly installed on the instrument of FIG. 1. the instrument being shown in phantom lines.
Figure 6:
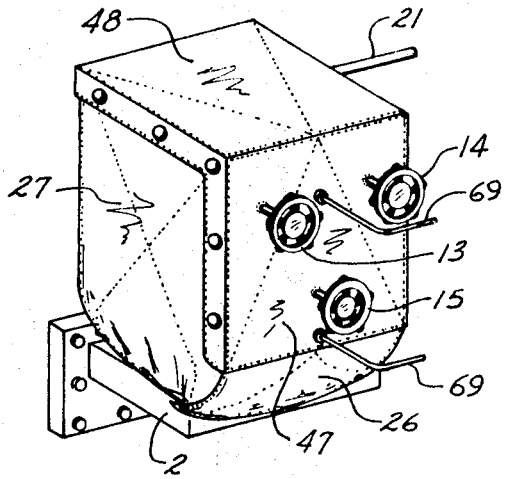
FIG. 6 is a view corresponding to FIG. 5 with the insulating jacket and cover installed.

Broadly considered, a protective jacket according to the invention has the general contour of the exterior of the instrument or control device to be protected, and has separable fasteners of a desired type, which may include a drawstring, to facilitate installation and removal of the jacket.

In one of the embodiments, which will subsequently be discussed, the jacket is in two separate pieces which are separately installed on the instrument and then connected together by fasteners carried by the two parts of the jacket to provide the necessary thermal insulation.

In the several embodiments, a unique wall structure of the insulating jacket is used which includes an outer layer of weatherproof material, an inner layer with heat resistant properties and an intermediate layer with good insulating properties. By providing a jacket with walls having the properties described, and by shaping the jacket to the proper configuration, any one of a number of instruments can be effectively insulated merely by pulling the appropriate insulating jacket over the instrument and closing the jacket tightly around the support or bracket on which the instrument is mounted.

Referring now to the drawings in detail, and particularly to FIGS. 1 and 2, there is shown a control instrument 1, which may be a conventional in-line mixer device used in chemical process equipment, instrument 1 being mounted on an L-shaped support 2 which is secured to a mounting plate 3 fixed to a wall or other structure 4 with bolts 5. Control instrument 1 includes pipes 6 and 7 connected to a front face of support 2, and which communicate with other pipes (not shown) of the system in which instrument 1 is installed. As shown at FIGS. 1 and 2, pipes 6 and 7 curve upwardly from support 2 and communicate with control equipment within housing 8 of instrument 1. Extending between pipes 6 and 7 is a connecting pipe 9.

Valves 10 and 11 are located respectively adjacent the upper ends of pipes 6 and 7 and a valve 12 is located in connecting pipe 9. Each of valves 10–12 includes a conventional cylindrical stem 12' which projects out in front of instrument 1 in a direction generally perpendicular to wall 4. Mounted on the ends of the stems of valves 10–12 by suitable spline or torque transmitting connections are valve operating handles 13–15.

The housing 8 which houses some of the control equipment of instrument 1 has generally parallel left-hand and right-hand sides 16 and 17, respectively, a front wall 18 which slopes outwardly, a rear wall 19 which slopes rearwardly (as viewed in FIG. 2) and a flat generally horizontal top wall 20. An additional pipe 21 projects horizontally from the upper rear corner of right-hand side 17, as shown at FIGS. 1 and 2.

A first embodiment of protective insulating jacket for instrument 1 of FIGS. 1 and 2, and the manner in which the insulating jacket is installed on instrument 1, is shown at FIGS. 3–6. The protective jacket 22 is of two-part construction having a body portion 23 and a cover portion 24. Both body portion 23 and cover portion 24 are formed from flexible sheet material 25 of multilayer construction which is heat and weather resistant, and has good thermal insulating properties. The multilayer structure of the sheet will presently be described in detail.

Body 23 includes a front panel 26, a left-hand side panel 27, a rear panel 28, and a right-hand side panel 29. (The terms right-hand, left-hand, etc., refer to the positions the panels occupy when installed on instrument 1.) The several layers of material which form sheet 25 are stitched together across each panel by stitching or sewing such as at 30 and 31, advantageously with durable nylon thread and which extends diagonally across each of the rectangular panels. In addition, a reinforcing tape 32 is folded over all the exposed outer edges of each panel and is stitched to the panels with stitching 33 to both join the several layers of the material which form sheet 25 and to secure the tape to the panels. Parallel spaced apart seams 34 and 35 are provided between side panel 29 and rear panel 28, and seams 36 and 37 are provided between rear panel 28 and side panel 27. Each seam includes a row of stitching and the parallel seams 34 and 35, which are spaced only slightly apart, provide a hinged connection between rear panel 28 and side panel 29. Similarly, seams 36 and 37 provide a hinge connection between rear panel 28 and side panel 27. Body 23 preferably has panels 27–29 formed from a single integral piece of sheet material 25 with hinged connections between panels formed by the respective stitchings 34–37. Front panel 26 which is shorter in height than panels 27–29 extends slightly less than half way up side panel 29 and is secured to the panel by rows of stitching 38 and 39. The front panel depends downwardly below the bottom edges of panels 27–29. Front panel 26 has its exposed edges covered with the tape 32 held in place by the stitching 33.

Connected to the side of front panel 26 which is parallel to seams 38, 39 is a closure flap 40. Flap 40, as will subsequently be described in detail, is formed from material substantially thinner than the material of panels 26–29. Fixed to flap 40 are two female snap fasteners 41 and 42 which are spaced apart from each other the same distance as the complementary male snap fasteners 43 and 44 at the side edge of panel 29 so that fasteners 41 and 42 can be snapped onto fasteners 43 and 44 after body 22 is wrapped around instrument 1 as shown at FIG. 5. A plurality of eyelets 45 are located in spaced relation to each other along the bottom edge of panels 26–29 to provide reinforced openings through which a drawstring 46 is threaded as shown at FIG. 3.

Cover 24 includes a front panel 47 and a top panel 48 formed from the same material as panels 26–29. Panels 47 and 48 are each rectangular and are reinforced by stitching 49 which extends diagonally from the corners of one panel to the corners of the adjacent panel. A seam comprised of parallel rows of stitching 50, 51 separates panel 47 from panel 48 and facilitates maintaining the right angle fold between the vertical front panel 47 and the horizontal top panel 48.

Secured to the opposite side edges of panels 47 and 48 are generally L-shaped flaps 52 and 53, respectively, each of which projects perpendicularly from and inwardly of panels 47 and 48. These flaps 52 and 53 are of thinner material than panels 47 and 48. Fixed to flap 52 are a plurality of female fasteners 54 which are spaced apart from each other the same distance that male fasteners 55 of panel 27 are spaced so female fasteners 54 can be secured to male fasteners 55 when the insulating jacket is installed on instrument 1. Female snap fasteners 56 on flap 53 are likewise spaced the same distance as male fasteners 57 on panel 29 so that these fasteners can be secured to each other when the insulating jacket is installed. Secured to and depending downwardly from the rear edge of top panel 48 is a rear flap 58 which is also secured to the ends of flaps 52 and 53. Rear flap 58 has female fasteners 59 spaced apart the same distance as male fasteners 60 on rear panel 28 of body 23.

Front panel 47 of cover 23 has three openings 60–62 extending therethrough, the openings being reinforced with several concentric circles of suitable stitching. Openings 60–62 have the same spacing and array as stems 12' of valves 10–12 so that these openings can receive the stems 12' when the jacket is installed.

Also formed in front panel 47 are a pair of openings to receive conduit connectors 63 and 64 which extend through and are secured to panel 47. Conduit connectors 63 and 64 are connected, respectively, to the opposite ends of a short length of sinuously curved tubing 65 which is positioned immediately adjacent inner surface 66 of panel 47. When connectors 63 and 64 are connected to a suitable steam line or other source of heated fluid (not shown), tubing 65 is heated with corresponding heating of the instrument on which the insulating jacket is installed. This arrangement including connectors 63 and 64 forms a portion of a system termed in the art as "steam tracing."

Installation of the insulating jacket comprised of body 22 and cover 24 will now be explained with reference to FIGS. 3–6. First, valve operating handles 13–15 are removed from instrument 1. Then, body 22 is folded around the instrument as shown at FIG. 5 so front panel 26 is generally parallel to front wall 18 of the instrument, left-hand side panel 27 is adjacent left-hand side 16 of the instrument, rear panel 28 is adjacent rear wall 19 of the instrument, right-hand side panel 29 is adjacent right-hand side 17 of the instrument. The panels are so dimensioned that body 22 is snugly received about instrument 1 when fasteners 41 and 42 are snapped onto fasteners 43 and 44. To accommodate additional pipe 21, an opening 67 is formed in panel 29. The sides of the opening are reinforced with the tape 32 as are the sides of a slit 68 which extends from the opening to the top edge of panel 29 and allows additional pipe 21 to be seated in the opening by pulling the jacket upwardly. Next, cover 24 is positioned adjacent the instrument with openings 60–62 aligned with valve stems 12'. The cover is then pushed rearwardly so the valve stems pass through the respective openings. Then, snap fasteners 54 and 56 of flaps 52 and 53 are aligned with the male snap fasteners 55 and 57 respectively of panels 27 and 29, and the fasteners are connected together as are fasteners 59 of rear flap 47 and fasteners 60 of rear panel 28. With the fasteners so connected, body 23 is secured against sliding downwardly by cover 24.

Next, drawstring 46 is tightened to pull the bottom portions of each of panels 26–29 of body 23 snugly around the support 2, whereupon instrument 1 is completely enclosed by the insulating jacket. Then, steam piping 69 is connected to conduit connectors 63 and 64, the steam piping coming from associated equipment (not shown). Finally, valve operating handles 13–15 are replaced on valve stems 12' and the installation is completed.

Since flaps 52, 53 and 59 close over the panels 27–29, it is assured that rain will run off the installed jacket without seeping into the enclosure formed by the jacket around the instrument. In addition, the flap 53 is sufficiently long to overlap a portion of flap 40 to also exclude rain. The dimensions of openings 60–62 are such that the material of panel 47 closely embraces stems 12' of the valves and thus a close fit which excludes water is obtained. A similar close fit at pipe 21 is provided. To remove the jacket for servicing, it is merely necessary to pull on the flaps to open the several fasteners and loosen the drawstring. When the instrument has been serviced, the jacket is replaced in the manner previously described.

As previously mentioned, jacket 22 forms a weatherproof insulating enclosure for the instrument to be protected. Referring now to FIGS. 7–9, there are shown several different structural arrangements for the material of the flexible sheet from which the insulating jacket is formed. As shown at FIG. 7, sheet 25 is comprised of multilayer flexible material including an outer layer 70, an inner layer 71, and an intermediate layer 72. Outer loyer 70 is a flexible sheet of commercially available neoprene coated nylon base material which is aluminized for added protection of the instrument and reflection of heat. This layer 70 can be of the structure described in U.S. Patent 2,769,772 or 2,767,104. For the jacket shown and described with reference to FIGS. 1–6, outer layer 70 is constructed of 16 oz. material of the type stated. Inner layer 71 is a woven cotton material such as is available under the name cotton drill, and which is suitably treated to make it fire resistant and mildew proof, for example, as disclosed in U.S. Patent 2,464,342. For the jacket of FIGS. 1–6, suitably treated 8 oz. cotton drill is used. Intermediate layer 72 is an insulating material of resin bonded glass fiber insulation, such as Microlite, a product of Glass Fibers, Inc. For the jacket of FIGS. 1–6, intermediate layer 72 is initially one inch thick, has a density of 2.5 pounds per cubic foot and is compressed to ⅛ inch thickness by attaching outer layer 70 to inner layer 71 with stitching such as the diagonal stitchings 30 and 31 and the edge stitchings 33–39.

With reference to FIG. 8, the structure of a flexible sheet 25' as shown. Here, outer layer 70 is identical to the corresponding layer previously described, and intermediate layer 72 is likewise identical. However, inner layer 71' is formed from an asbestos cloth. The several layers are connected by stitching, as previously described. Sheet 25' of FIG. 8 has particularly utility where the insulating jacket formed from sheet is used to protect an instrument subjected to high temperature fluids. Where the fluids, such as high pressure steam, have high temperatures, the woven cotton layer 71 tends to scorch and is thus damaged by the heat. However, by using an asbestos cloth, which is advantageously woven, a durable inner layer is provided. Front panel 47 of cover 24 is advantageously formed from the material of sheet 25' which includes the asbestos inner layer 71' to prevent damage to the jacket.

FIG. 9 shows a third arrangement of the multilayer construction of a sheet 25" from which the insulating jacket may be formed. Here, outer layer 70 is identical to that previously described, inner layer 71' is of asbestos as previously described with reference to FIG. 8, and there is an intermediate layer 72' which is comprised of a layer of resin bonded, glass fiber insulation 72 adjacent a layer of woven cotton material 71. The sheet 25" has particular utility for retainment of heat where high temperatures are encountered either in the instrument or in the steam tracing, and where added insulating as provided by the extra layer of asbestos cloth 71', and added strength as provided by the layer of woven cotton 71, are necessary.

All the panels of jackets 22 are formed from a flexible sheet of one of the constructions of FIGS. 7–9. However, flap 40 of body 23 (FIG. 3) and flaps 52, 53 and 59 of cover 24 are formed from a thinner material having inner and outer layers, such as layers 70 and 71, engaging each other, with the intermediate layer eliminated. Using only an inner layer 70 and outer layer 71 as the material of the flaps, provides flaps which are considerably more flexible than the panels of the jacket, yet does not lessen the insulating properties of the jacket since each flap overlaps a panel, and all the panels are of the thicker material including an intermediate layer of insulating material.

Referring now to FIGS. 10–12, a second embodiment of insulating jacket will now be described. Insulating jacket 74 has particular utility for protecting the gauge assembly 75 which, as seen at FIG. 10, includes a rectangular parallelepiped housing 76 mounted on an upright support standard 77. Conduits (not shown) connected to gauges 78 extend through the standard 77. A protective glass window 79 is mounted on housing 76 and extends across the gauges.

With reference to FIG. 11, insulating jacket 74 is seen to take the form of an inverted bag formed from rectangular panels including a front panel 80, parallel side panels 81 and 82 connected to the side edges of front panel 80, a rear panel 83 connected to the rear edges of side panels 81 and 82, and a horizontal top panel 84 secured to the top edges of panels 80–83 to form a weatherproof enclosure with an open bottom 85. The several panels are dimensioned so the enclosure is of a size to accommodate housing 76 and thus permits jacket 80 to be slipped over the top of the housing to protect gauge assembly 75. An opening is formed in the upper portion of front panel 80 of a size approximating the size of glass window 79, and a transparent plastic viewing window 86 is secured in the opening so that gauges 78 may be viewed and read after insulating jacket 74 is installed on gauge assembly 75, as shown at FIG. 12. Male snap fasteners 87 and 88 are secured to front panel 80 adjacent the lower edge of the panel and complementary female fasteners 87' and 88' are secured to rear panel 83, also adjacent its lower edge, the several fasteners being arranged in aligned relation with each other and properly spaced so that when the fasteners are connected together as shown in FIG. 12, open bottom 85 of insulating jacket 74 fits snugly around standard 77.

The insulating jacket 74 has double rows of stitching separating each of panels 80–84 from each other, the stitching reinforcing the jacket and maintaining the general parallelepiped shape of the jacket which conforms to the configuration of housing 76. Transparent window 86, which is formed from a sheet of flexible transparent plastic material, advantageously .015 Mylar sheet, is interposed between the outer layer 70 and inner layer 72 or 72', depending on which of the several constructions of sheet material of FIGS. 7–9 is used to form the jacket 74. Transparent window 86 is held in position by several rows of stitching or sewing 89 which extends completely through the several layers of the material of the insulating jacket and completely surrounds the opening for the transparent window to provide a long lasting durable construction. The insulating jacket 74 may of course be formed by precutting each of panels 80–84 to the proper size and then stitching same together, or selected ones of the panels, for example, panels 81, 84 and 82 may be formed from a single sheet and be provided with suitable stitching separating the panels, and front panel 80 and rear panel 83 can be subsequently secured to these panels by stitching or sewing, as shown.

Referring now to FIGS. 13–15, there is shown a Bourdon-type gauge 90 which is used to measure pressure in a pipe 91 which also forms a support for the gauge. Connected in pipe 91 is the usual shut-off valve 92 with torque or force transmitting stem 93 and valve manipulating handle 94. Insulating jacket 95, FIG. 14, finds particular utility in insulating gauge 90 of FIG. 13. The construction of insulating jacket 95 is quite similar to the construction of insulating jacket 74 save that top portion 96 of the jacket is curved to conform to the curvature of gauge 90, and hence sides 97 and 98 are advantageously formed integral with top portion 96 from a single sheet of insulating material of the desired one of the forms shown at FIGS. 7–9. The inner and outer layers of the sheet used to form the portions 96–98 are connected together by several rows of stitching 99. Front panel 100 and rear panel 101 are separately cut and stitched to the sheet forming portions 96–98. Front panel 100 has an opening formed near its upper end, the opening being circular to receive a transparent window 102 which is sewed to front panel 100 to secure the window in the jacket. The location of window 102 is chosen to correspond to the location of the face of gauge 90 so the gauge can be viewed after jacket 95 is installed on gauge 90 as shown at FIG. 15. Adjacent the bottom edge of the several panels and portions of jacket 95 are a plurality of spaced apart eyelets 103 through which a nylon drawstring 104 is threaded. Side panel 98 is formed with an opening 105 to receive stem 93 and operating handle 94 of valve 92. This opening is vertically elongated to permit pulling side panel 98 over valve handle 94 without removing the handle. A flap 106 having a height slightly greater than the height of opening 105 is stitched to side panel 98 to hinge one side of the flap to the panel. The flap is horizontally split as at 107 to permit closing the flap around valve stem 93. Pairs of complementary snap fasteners 108 are connected respectively to flap 106 and side panel 98 to fasten the flap after the jacket is installed.

To install jacket 95 on gauge 90 to both thermally insulate and protect both the gauge and the valve 92, jacket 95 is merely pulled down over the gauge and valve, opening 105 in side panel 98 is aligned with valve operating handle 94 and the bag is pulled to force the handle through the opening, and then it is merely necessary to pull drawstring 104 to close the bottom of the jacket 95 tightly around pipe 91. When snap fasteners 108 are closed, the side edges of flap 105 closely embrace stem 93 to prevent heat loss as well as the entry of rain.

Figure 16:
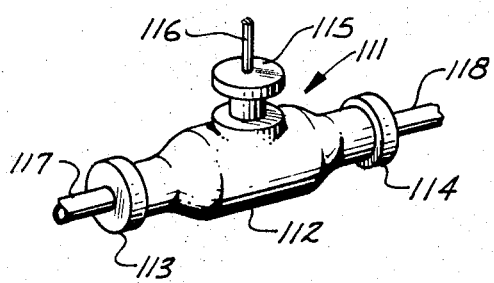
FIG. 16 shows still another instrument, in this case a pneumatically operated valve assembly.
Figure 18:
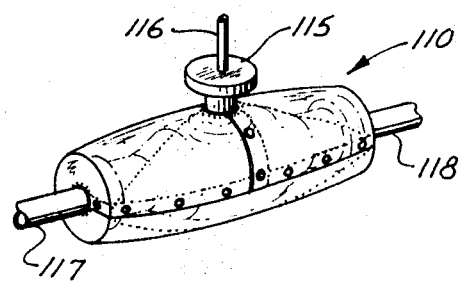
FIG. 18 shows the insulating jacket of FIG. 17 installed on the valve of FIG. 16.
Figure 17:
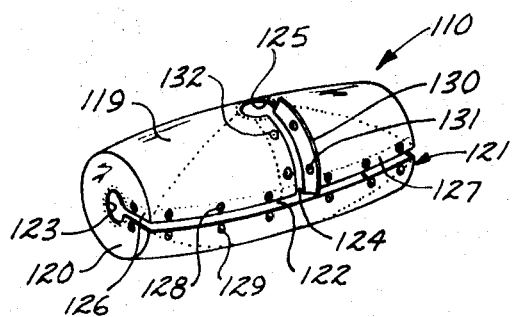
FIG. 17 shows an insulating jacket constructed in accordance with this invention for protecting the valve of FIG. 16.

Referring now to FIGS. 16–18, a fourth embodiment of insulating jacket in accordance with this invention will be described. The control device insulated by insulating jacket 110 is a pneumatically operated valve 111 which includes an enlarged body portion 112 with thermal flanges 113 and 114 at opposite ends of the body. In addition, there is a flanged member 115 seated on body 112 which has a central bore (not shown) with suitable seals therein to permit operating the valve by movement of an operating rod 116 which extends through the bore and is remotely operated by a pneumatic mechanism (not shown). Valve 111 controls the flow of fluid through pipes 117 and 118 secured to valve 111 at flanges 113 and 114 respectively.

As shown at FIG. 17, insulating jacket 110 is generally cylindrical and defines an enclosure to accommodate valve 111. Jacket 110 includes a body portion 119 in the form of a cylindrical shell, and separately formed circular ends 120 and 121 secured to the ends of the shell by sewing or stitching. The jacket is longitudinally split at one side to form an opening 122. Opening 122 extends the entire length of body 119 and communicates with each of the centrally located circular openings 123 in the respective ends 120 and 121. A short circumferential opening 124 extends centrally of body 119 from opening 122 and communicates with a circular opening 125 dimensioned and positioned to close about the reduced diameter portion of flanged member 115. Flaps 126 and 127 are secured to and depend downwardly from the body and ends of the jacket. The flaps are provided with female snap fasteners 128 spaced apart the same distance as complementary male fasteners 129 fixed along the opposing edge of opening 122. In addition, a flap 130 is connected to the body 119 at one side of opening 124, the flap having female fasteners 131 which are located in complementary positions to the male fasteners 132 at the opposing edge of opening 124. All the openings of jacket 110 are reinforced by taping and stitching in the manner previously described.

To install jacket 110 on valve 111, it is merely necessary to enlarge the several openings of the jacket by pulling on the flexible material and then slip the jacket over valve 111 transversely so that pipes 117 and 118 seat in openings 123 and the reduced diameter portion of flanged member 115 seats in opening 125. Then, closing the complementary fasteners completes the installation. While not shown in detail with regard to jacket 110 of FIGS. 17 and 18, it is to be understood that the several layers of material which form the jacket are stitched together in a desired pattern, as described for the insulating jacket of FIGS. 1–6. It is also to be noted that the flaps 126 and 127 close downwardly and over the adjacent edges of the jacket and thus prevent rain from running into the jacket.

While several forms of the invention are shown, it is understood that various changes may be made in the construction by those skilled in the art without departing from the spirit of the invention as defined in the appended claims. For example, other types of fasteners may be used and the protective jacket can of course be used to insulate various instruments, control equipment and other devices without departing from the spirit of and intended scope of this invention.

What is claimed is:

1. An insulating jacket for a process plant instrument assembly located out-of-doors, exposed to the elements, and secured to a support, said instrument assembly including piping through which fluid is directed and a control including a force transmitting element extending from the instrument assembly, said insulating jacket being arranged for installation around the instrument assembly without removal of the instrument from the support, said jacket comprising wall means including a plurality of panels defining an enclosure for the instrument, control, and piping;

each panel comprising:
   an outer layer of flexible weatherproof material,
   an inner layer of flexible heat resistant material,
   an intermediate layer of flexible thermal insulating material, and
   means connecting said inner and outer layers together at a plurality of locations on each panel;

said wall means defining an opening via which the jacket can be closed over the instrument without disturbing the instrument support;

securing means on said panels to close said opening in closely embracing relation to said support, said panels defining at least one additional opening to accommodate said force transmitting element for movement relative to the jacket, wherein each panel further includes a second intermediate layer between said inner layer and said first mentioned intermediate layer, said second intermediate layer comprising a fire resistant and mildew resistant cotton drill fabric; said outer layer is a neoprene coated aluminized nylon base material; said inner layer is asbestos cloth; and said first mentioned intermediate layer is glass fiber insulation.

References Cited
UNITED STATES PATENTS

| | | | |
|---|---|---|---|
| 2,404,736 | 7/1946 | Marick | 150—2.6X |
| 2,707,721 | 5/1955 | Anderson et al. | 150—52X |
| 2,759,522 | 8/1956 | Limm | 161—204X |
| 2,522,381 | 9/1950 | Kramer | 150—52 |
| 2,758,413 | 8/1956 | Woodruff | 150—52 |
| 2,985,552 | 5/1961 | Watanabe | 150—2.2 |
| 2,988,457 | 6/1961 | Gatcomb | 161—227X |
| 3,292,179 | 12/1966 | Iacono et al. | 2—81 |
| 3,314,464 | 4/1967 | Veilleux | 150—52 |
| 3,428,103 | 2/1969 | Walsh | 150—2.2 |

JOHN T. GOULKASIAN, Primary Examiner

D. J. FRITSCH, Assistant Examiner

U.S. Cl. X.R.

150—2.2, 2.6, 52; 161—112, 200, 204, 205, 214, 217